US008050696B2

(12) United States Patent
Buga et al.

(10) Patent No.: US 8,050,696 B2
(45) Date of Patent: *Nov. 1, 2011

(54) SYSTEM AND METHOD FOR WIRELESSLY TRANSFERRING CONTENT TO AND FROM AN AIRCRAFT

(75) Inventors: Wladyslaw Jan Buga, Rancho Santa Fe, CA (US); Tracy Raymond Trent, San Diego, CA (US)

(73) Assignee: Proximetry, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/770,595

(22) Filed: Apr. 29, 2010

(65) Prior Publication Data

US 2010/0291960 A1  Nov. 18, 2010

Related U.S. Application Data

(63) Continuation of application No. 12/343,662, filed on Dec. 24, 2008, which is a continuation of application No. 11/901,074, filed on Sep. 14, 2007, now Pat. No. 7,486,960.

(60) Provisional application No. 60/845,131, filed on Sep. 15, 2006.

(51) Int. Cl.
*H04Q 7/20* (2006.01)

(52) U.S. Cl. ............. 455/512; 455/431; 455/422.1; 455/403; 455/414.1; 455/3.01; 709/203; 709/204; 709/218; 709/219

(58) Field of Classification Search ............ 455/431, 455/422.1, 403, 517, 414.1, 414.2, 3.01, 455/432.1, 445, 500, 508, 550.1, 466, 414.3, 455/512; 709/203, 204, 218, 219

See application file for complete search history.

(56) References Cited

U.S. PATENT DOCUMENTS

| | | | |
|---|---|---|---|
| 5,524,272 A | 6/1996 | Podowski | |
| 6,163,681 A | 12/2000 | Wright et al. | |
| 6,181,990 B1 | 1/2001 | Grabowsky | |
| 6,741,841 B1 | 5/2004 | Mitchell | |
| 6,775,545 B2 | 8/2004 | Wright | |
| 6,810,527 B1 | 10/2004 | Conrad | |
| 6,816,728 B2 | 11/2004 | Igloi | |
| 6,876,905 B2 | 4/2005 | Farley et al. | |
| 6,894,611 B2 | 5/2005 | Butz et al. | |
| 6,901,064 B2 | 5/2005 | Cain | |

(Continued)

FOREIGN PATENT DOCUMENTS

EP  1101177  12/2007

(Continued)

*Primary Examiner* — Keith Ferguson

(74) *Attorney, Agent, or Firm* — Letham Law Firm LLC; Lawrence Letham

(57) ABSTRACT

A system and method for wirelessly transferring content to and from a vehicle, in particular, an aircraft. The content includes, for example, data, voice, video and multimedia, that can be wirelessly exchanged over a wireless communication link between an aircraft and a ground station while the aircraft is at or near a parking gate, or between aircraft. In an example, the system employs long distance metropolitan area technology, such as IEEE Standard 802.16 wireless technology, to increase transfer range. The parameter of the wireless communication link can be adjusted based on, for example, the location of the link. The content can further be provided between the vehicle and ground station based on priorities, such as the available link speed, importance of the information, and/or anticipated connection time between the vehicle and ground station. A media creation center can be networked to a plurality of base stations.

21 Claims, 9 Drawing Sheets

U.S. PATENT DOCUMENTS

| | | |
|---|---|---|
| 6,904,032 B2 | 6/2005 | Cain |
| 6,915,189 B2 | 7/2005 | Igloi |
| 6,954,449 B2 | 10/2005 | Cain |
| 6,958,986 B2 | 10/2005 | Cain |
| 6,963,292 B1 | 11/2005 | White |
| 6,982,987 B2 | 1/2006 | Cain |
| 7,027,409 B2 | 4/2006 | Cain |
| 7,103,456 B2 | 9/2006 | Bloch et al. |
| 7,280,825 B2 | 10/2007 | Keen et al. |
| 7,304,972 B2 | 12/2007 | Cain |
| 7,328,012 B2 | 2/2008 | Ziarno et al. |
| 7,333,458 B2 | 2/2008 | Cain |
| 7,454,203 B2 | 11/2008 | Levitan |
| 7,466,980 B2 | 12/2008 | Kauffman et al. |
| 7,599,691 B1 | 10/2009 | Mitchell |
| 7,620,374 B2 | 11/2009 | Ziarno et al. |
| 7,715,838 B2 | 5/2010 | Swensen et al. |
| 7,756,145 B2 | 7/2010 | Kettering et al. |
| 7,769,376 B2 | 8/2010 | Wright et al. |
| 7,791,473 B2 | 9/2010 | Allen et al. |
| 7,908,042 B2 | 3/2011 | Brinkley et al. |
| 7,970,410 B2 | 6/2011 | Brinkley et al. |
| 2002/0059614 A1 | 5/2002 | Lipsanen et al. |
| 2003/0032426 A1 | 2/2003 | Gilbert et al. |
| 2005/0053026 A1 | 3/2005 | Mullan et al. |
| 2005/0256616 A1 | 11/2005 | Rhoads |
| 2007/0042774 A1 | 2/2007 | Alcorn |
| 2007/0139169 A1 | 6/2007 | Mitchell et al. |
| 2007/0252734 A1 | 11/2007 | Greiner et al. |
| 2009/0047941 A1 | 2/2009 | Dembski-Minssen et al. |
| 2009/0092074 A1 | 4/2009 | Jamalipour et al. |
| 2010/0013628 A1 | 1/2010 | Monroe |
| 2010/0211236 A1 | 8/2010 | Ziarno |

FOREIGN PATENT DOCUMENTS

| | | |
|---|---|---|
| EP | 2278494 | 1/2011 |
| WO | WO 02/101969 | 12/2002 |

SYSTEM AND METHOD FOR WIRELESSLY TRANSFERRING CONTENT TO AND FROM AN AIRCRAFT

CROSS-REFERENCE TO RELATED APPLICATIONS

This application is a continuation and claims the benefit of U.S. patent application Ser. No. 12/343,662 filed Dec. 24, 2008, which is a continuation of U.S. patent application Ser. No. 11/901,074 filed Sep. 14, 2007, now U.S. Pat. No. 7,486,960, which claims the benefit of U.S. Provisional Patent Application No. 60/845,131 filed Sep. 15, 2006, all aforementioned applications are hereby incorporated by reference in their entirety.

FIELD OF THE INVENTION

The present invention relates to a system and method for the wireless transfer of content to and from an aircraft. More particularly, the present invention relates to a system and method for wirelessly transferring content including, for example, data, voice, video, and multimedia, between an aircraft and a ground station while the aircraft is at or near a parking gate, or between other aircraft.

BACKGROUND OF THE INVENTION

Many systems provide for use of up-to-date content on an aircraft by delivering portable entertainment media, such as videotape or digital versatile disc (DVD) to the aircraft prior to take-off. This procedure, of course, requires the physical creation of a master, duplication for every aircraft to be fitted, distribution of appropriate quantities to airport locations, and timely transfer of tapes/disks onto the aircraft. This procedure, however, does not provide for delivery of other data to the aircraft or data from the aircraft. Also, this process is very labor intensive, slow to distribute, and does not support any airline or flight related data on or off of the aircraft.

Newer digital systems that use digital servers for content storage and distribution provide up-to-date content to the aircraft by secure electronic transfer of the master over the Internet, for example, to a facility at or near the airport. At this facility, the content can be copied onto media appropriate for the aircraft (CD, DVD, memory stick) on an as-required basis to meet aircraft arriving at the gate. The media is carried to the gate and installed into the system of the aircraft. This approach significantly reduces the time and expense of physically shipping media to the various airports. Although this process is much faster in delivery and redistributes the labor effort to the various airport locations, it still requires the physical delivery of devices (CD, DVD, memory stick) to the aircraft at the gate. While such a device could also be loaded with some airline data, the timing of making the device probably does not permit it to contain any flight related data, such as passenger manifest data. If a writable device such as a memory stick is used, the same device can be used to offload aircraft data for physical transfer to an airport ground facility. However, this process is generally very labor intensive.

An industry concept commonly called "Gatelink" has been discussed in the industry for years. This concept requires a network to be wired to each airport gate, and a wired or wireless connection between the gate and the aircraft. Early attempts used optical links (e.g., infrared links), and an industry standard was developed, but the resulting products were commercially unsuccessful. More recently, common wireless local area network standards (such as IEEE 802.11a/b/g) have been identified and included within new Avionics standards (ARINC 763). While this standard is more than 5 years old, few airports have permitted its incorporation into the airport infrastructure.

With the "Gatelink" approach, the aircraft is recognized by the network when it arrives at the gate. Flight related data can be transferred off of the aircraft to a server on the ground. Also, any material appropriate for the flight, including airline operations data, flight related data including a passenger manifest, and up-to-date content, can be loaded onto the aircraft. This is a far superior technical approach toward moving data on and off of the aircraft. However, the short range of wireless local area network protocols requires that the implementation involve modification of the airport facility all the way to the actual aircraft gate.

Broadband satellite communications can be used to exchange significant amounts of data between the flying aircraft and the ground. Performance of these systems varies between the lower speed satellite communications (SATCOM) based systems (X.25, Swift64 or BGAN) to the higher speed KU band systems (ConneXion, Row44). In general, these satellite links are limited to between 64 Kbps and 20 Mbps. This bandwidth must be shared by all users in a large geographical area. In addition, the current regulations on aircraft based KU Band service do not permit aircraft to ground transmission to occur while the aircraft is on the ground. A single channel would be shared by many different aircraft at many different airports.

Cellular networks can also be used to transfer information to and from an aircraft while it is on the ground, but the bandwidth supported by such networks is at least an order of magnitude less than what is required to load the target content.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Figure 1:
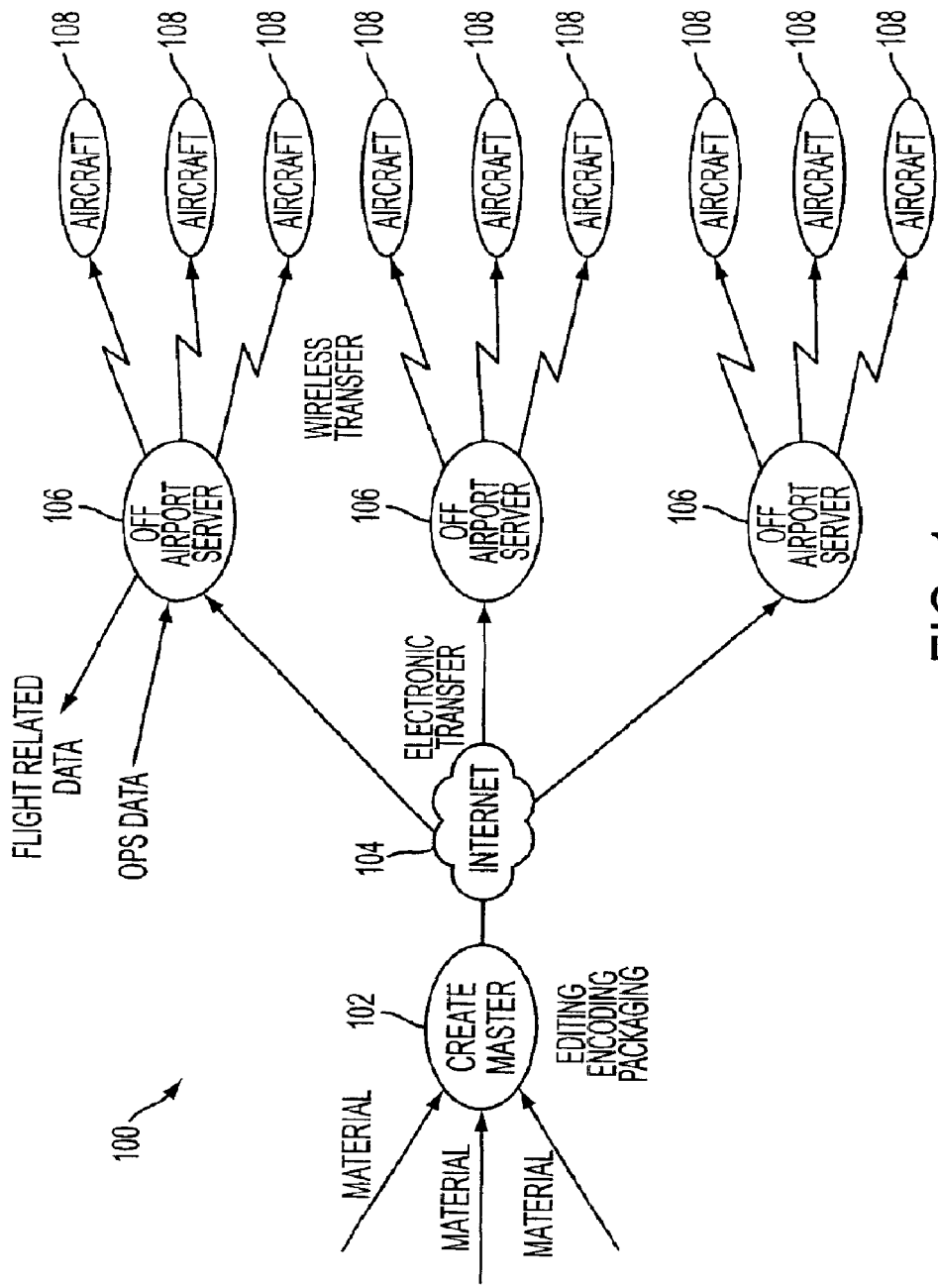
FIG. 1 is a conceptual diagram illustrating an example of a system for wirelessly transferring content to and from an aircraft according to an embodiment of the present invention.

As described in detail below, the present invention relates to a system and method for the wireless transfer of digital data from an aircraft to a ground station and from a ground station to the aircraft while the aircraft is at or near a parking gate. As shown in FIG. 1, an embodiment of the system 100 includes a media center 102 for creating a master file that is to be distributed. The media center 102 can be connected, for example, via the Internet 104 or any other type of network, to servers or base stations 106 that can be present, for example, at or proximate to airports. Servers or base stations 106 are each capable of wirelessly transmitting content to be received by transceivers on aircraft 108, for example. Specifically, the servers or base stations 106 utilize high-speed, long distance metropolitan area network technology (such as in accordance with IEEE Standard 802.16) instead of high-speed, local area technology (such as IEEE 802.11). The servers 106 therefore support real-time, or substantially real-time, transfer of information on and off of the aircraft 108. The servers 106 can operate without, or with minimal, modification to the airport facility, thus allowing the system 100 to be deployed with minimal cooperation from airport authorities.

As can be understood by one skilled in the art, the emerging Metropolitan Area Network standards, such as IEEE Standard 802.16, support high speed data transfer (e.g. within a range at or about 20 Mbps to at or about 70 Mbps) over a significant distance (e.g., within a range of at or about 3 miles to at or about 5 miles). Through a combination of a server/base-station, base-station transceiver, aircraft transceiver, aircraft antenna, and aircraft server, the system 100 can provide data transfer to/from the aircraft for the entire duration that it is at (or possibly near) the gate of the airport. With the addition of carefully located repeaters, the wireless network can surround an airport with service while minimizing any effect on the airport facility.

Any wireless technologies that support the wireless exchange of data across a distance within a range of about 3 to 5 miles can be used. As alternate technologies are developed, they can be considered for use as well. Frequency selection could be determined by the base station 106 or by physical location of the aircraft 108, and high bandwidth is desirable.

It should also be noted that communication does not have to be restricted to information exchanged between the base station 106 and the aircraft 108. Rather, aircraft 108 can communicate directly each other with or without a base station. If one aircraft 108 has content a second aircraft 108 does not have, that content can be transferred aircraft to aircraft wirelessly or via a wire, fiber, etc., without an intermediate base station 106. Performance improvements may be possible by creating a mesh network of aircraft 108, base stations 106, and repeaters.

The content to be transferred to and from the aircraft 108 typically includes maintenance data, system performance data, system usage data, and transaction information. Data to be transferred to the aircraft typically includes content or media for In-Flight Entertainment (IFE), passenger data such as a manifest, and airline operational data such as airline memos, training, and procedure information. Of particular interest is the transfer of time sensitive content or media for IFE, since there is a strong desire to provide up-to-date news, weather, and sports content to an aircraft for use during the next flight.

Figure 2:
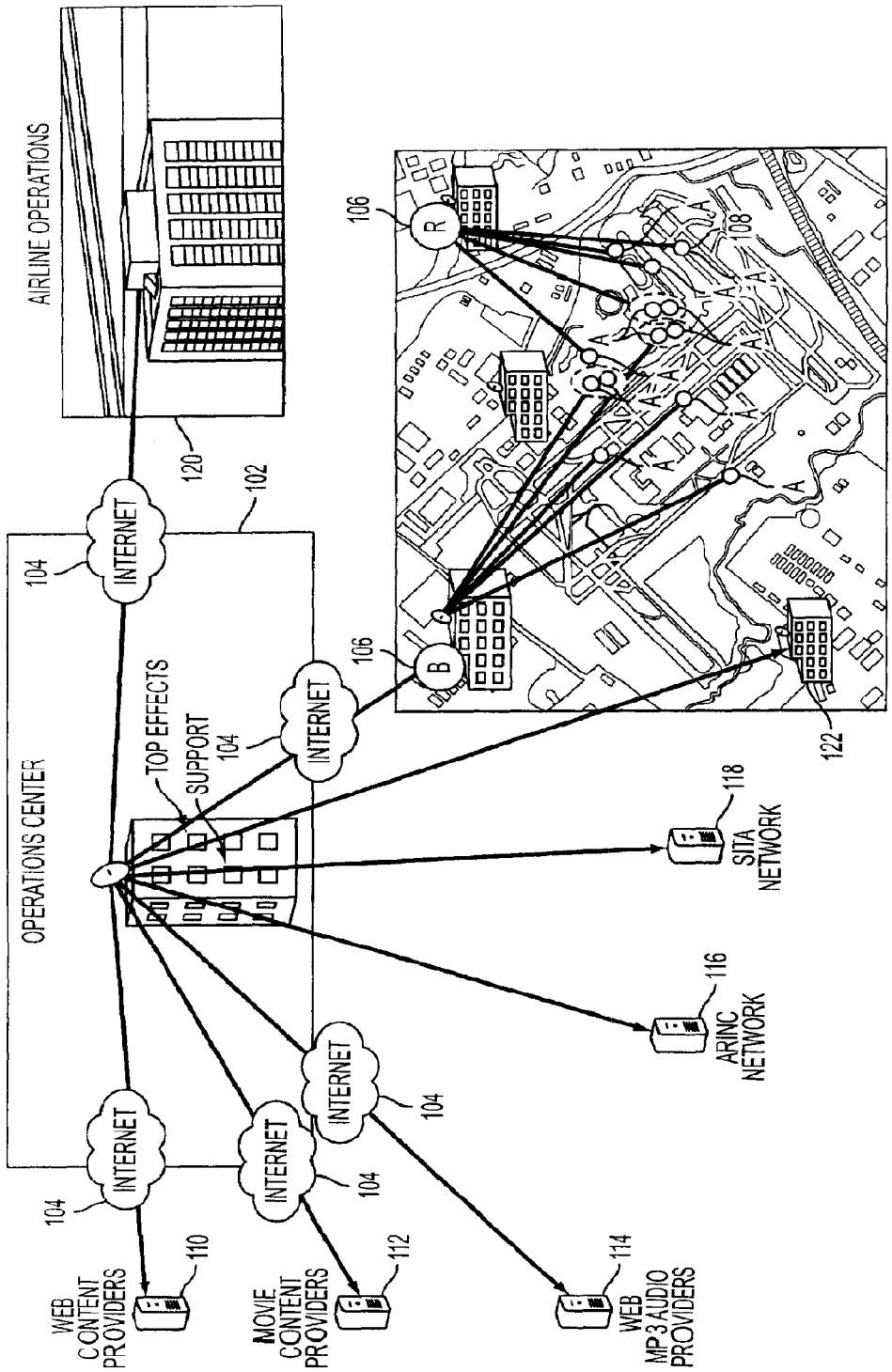
FIG. 2-5 illustrate examples of content providers and examples of the relationship between the components of the system shown in FIG. 1.
Figure 3:
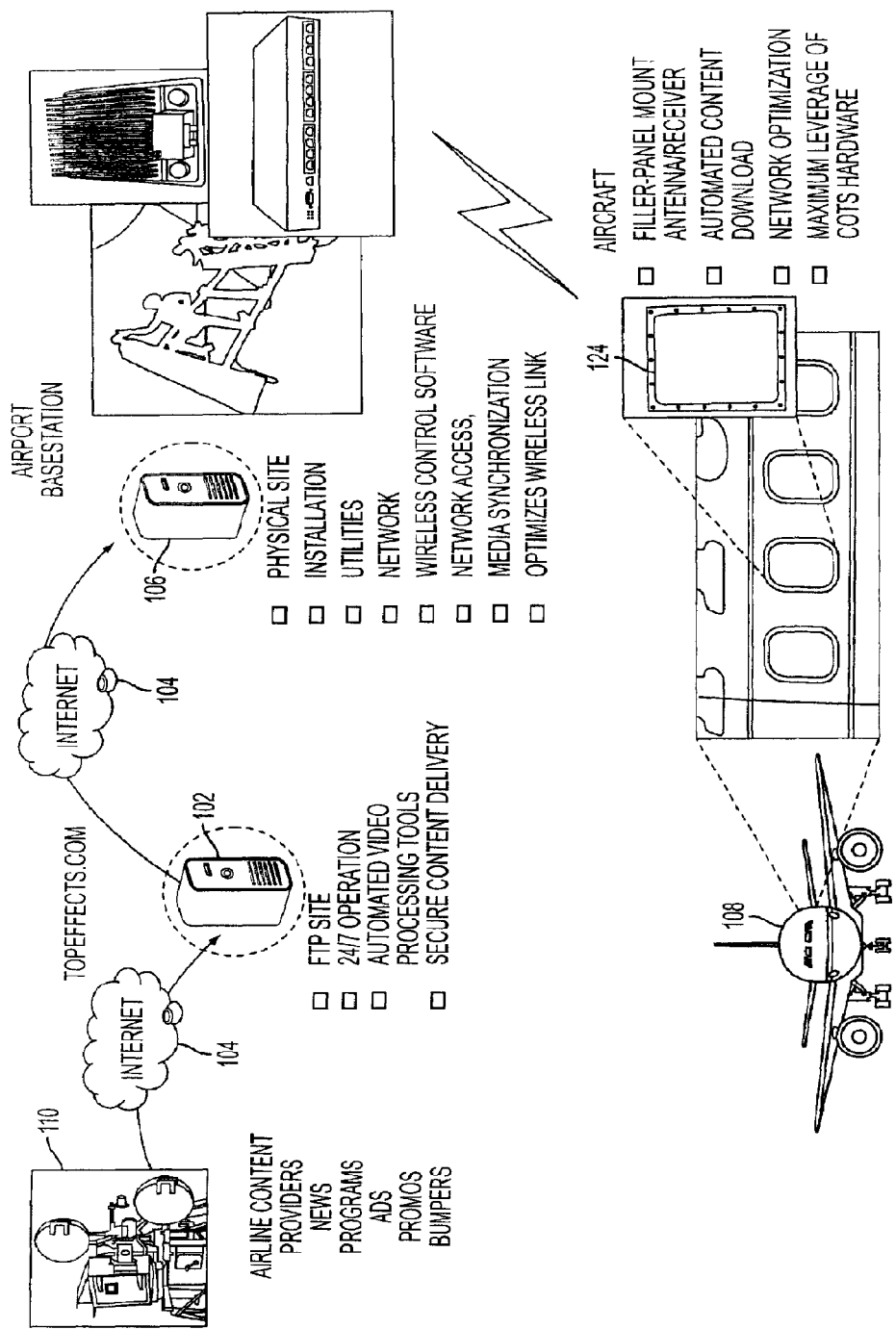

FIGS. 2-5 illustrate examples of content providers and examples of the relationship between the components of the system 100. As shown in FIG. 2, the operations center 102 can cunicate with, and thus receive information from (or exchange information with) web content providers 110, movie content providers 112, web MP3 audio providers 114, Aeronautical Radio, Inc. (ARINC) providers 116, and Societe Internationale de Telecommunications Aeronautiques (SITA) providers 118, to name a few, as well as an airline operations center 120 and an alternate server site 122. As shown in FIG. 3, in particular, the base station 106 in one example communicates with a filler-panel mount antenna/receiver 124 that is mounted in the aircraft 108.

Figure 4:
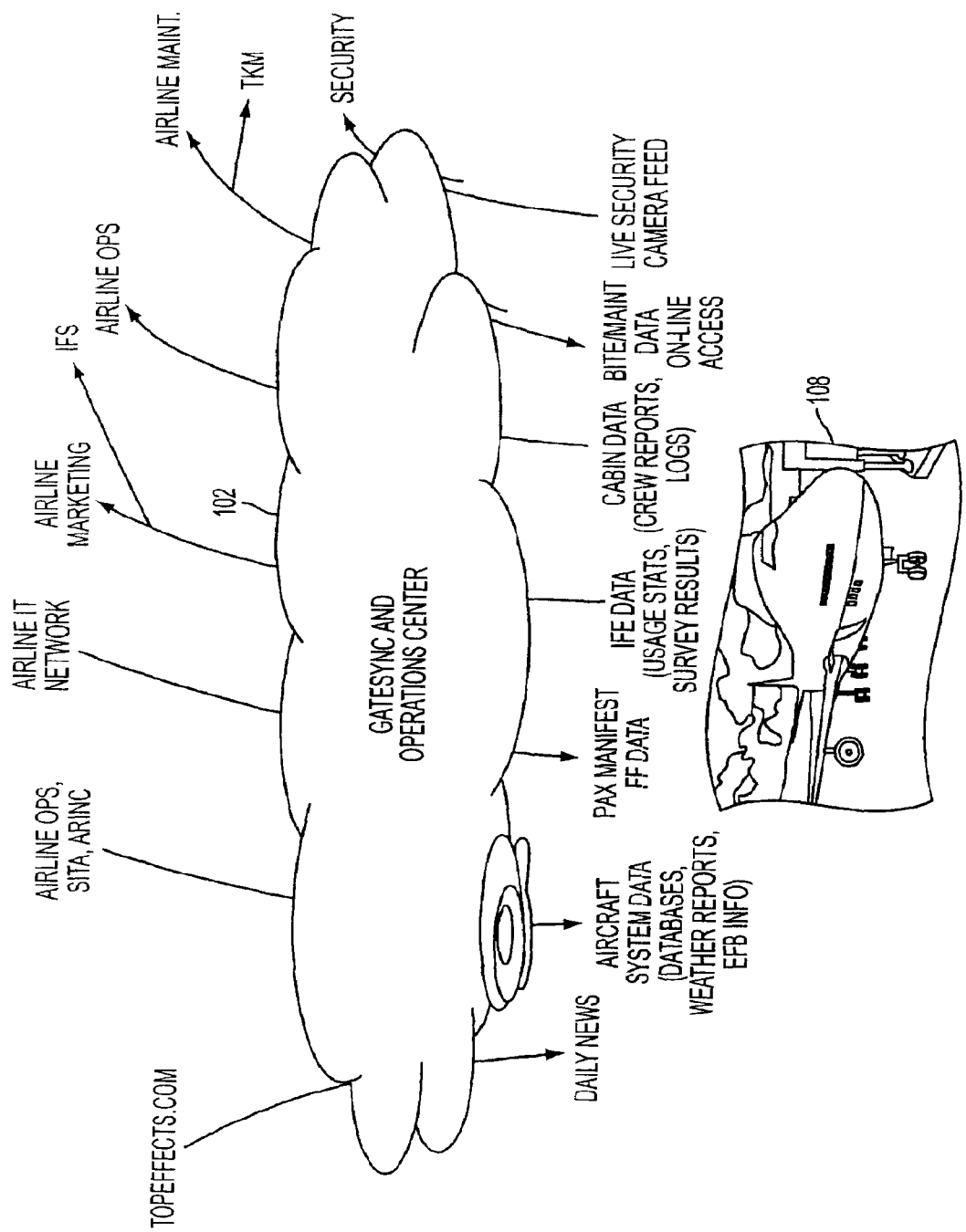
Figure 5:
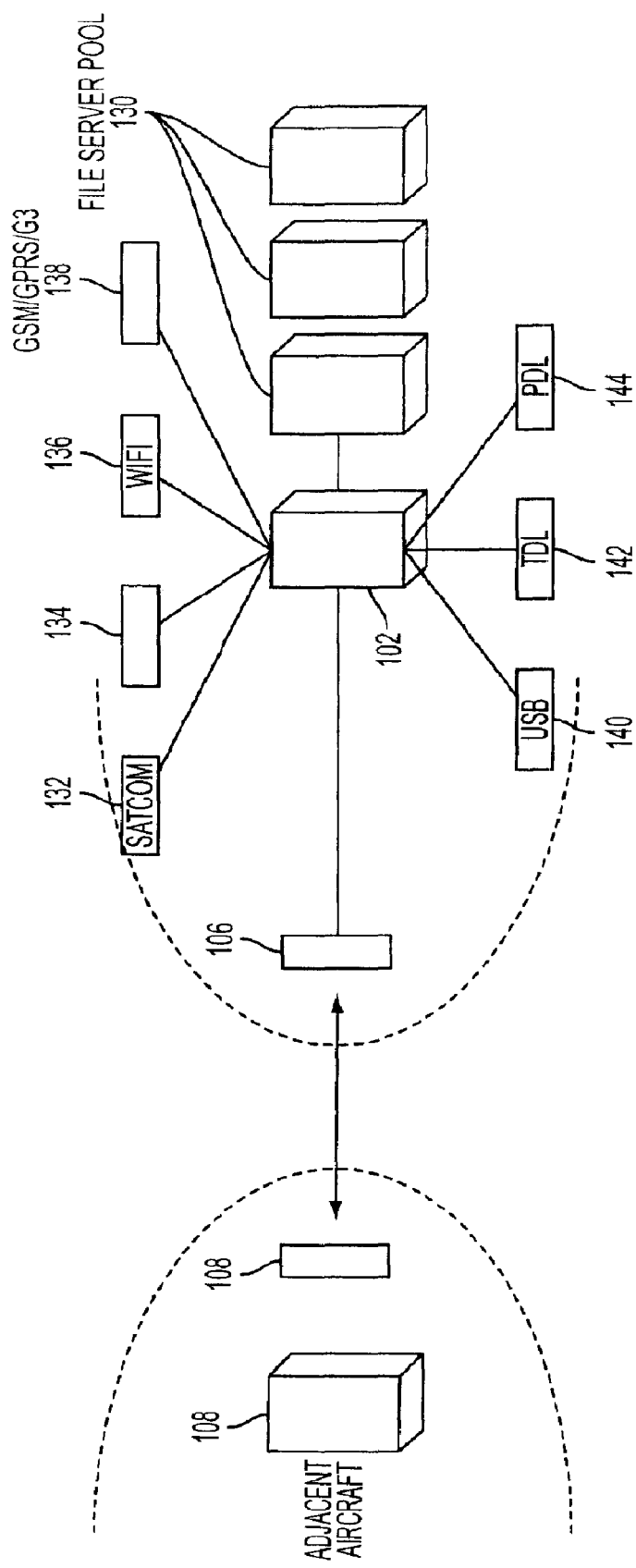

FIGS. 4 and 5 further illustrate the various types of content that can be exchanged between the operations center 102 and the aircraft 108, and the various types of components that can communicate with the operations center 102. FIG. 5, in particular, illustrates that the operations center 102 can communicate with a file server pool 130, a SATCOM network 132, a Worldwide Interoperability for Microwave Access (WiMAX) IEEE Standard 802.16 network 134, a wireless fidelity (WIFI) IEEE Standard 802.11a network 136, a global satellite for mobile/general packet radio service/G3 (GSM/GPRS/G3) network 138 (e.g., a cell phone technology network), a universal serial bus (USB) device 140 such as a memory stick, a top level domain (TDL) device 142 such as a removable hard drive loaded on board an aircraft, and a page description language (PDL) device 144 such as a portable loader carried on board an aircraft, to name a few. As stated above, the base station 106 provides for a real-time, high-speed data link on and off of the aircraft 108 that can be used while the aircraft 108 is on the ground, such that additional systems can be connected on both the aircraft side as well as the ground side. These systems can be used to exchange information such as security video, flight related information, and so on. The content can be loaded daily, monthly, or as frequently as desired.

As can be appreciated from FIGS. 3-5, for example, when a vehicle 108 such as an aircraft communicates with a server 106, the vehicle 108 will exchange identification information with the server so the server 106 will be able to identify the vehicle 108. The content that is provided to the vehicle 108 can then be based, at least in part, on the vehicle's identity. Also, software in the server 106, for example, the wireless control software (see FIG. 3), can operate to adjust the parameters of the wireless link between the server 106 and the vehicle 108 based on the location of the server 106 (i.e., the location of the link), so that the wireless link can conform to, for example, the wireless regulations governing communications in that location. For instance, some countries or areas of a country may require that wireless communication links comply with a particular standard different than those in other areas of the country or in other countries. Hence, the server 106 can include a location identification mechanism that can communicate with, for example, an external device (e.g., a GPS) so that the server 106 can identify its location, and the software can adjust the parameters of the link based on the assessed location. Likewise, the communication device on the vehicle 108 can include a mechanism, such as software and hardware, that can enable the communication device on the vehicle 108 to support the type of link established by the server 106.

In addition, the vehicle 108 can include a traffic prioritization mechanism embodied, for example, in its hardware and software, to prioritize the transfer of information from the vehicle 108 to the server 106 in accordance with, for example, the available link speed, importance of the information, and/or anticipated connection time with the server 106. Similarly, the server 106 can include a traffic prioritization mechanism embodied, for example, in its hardware and software, to prioritize the transfer of information from the server 106 to the vehicle 108 in accordance with, for example, the available link speed, importance of the information, and/or anticipated connection time with the vehicle 108.

Figure 6:
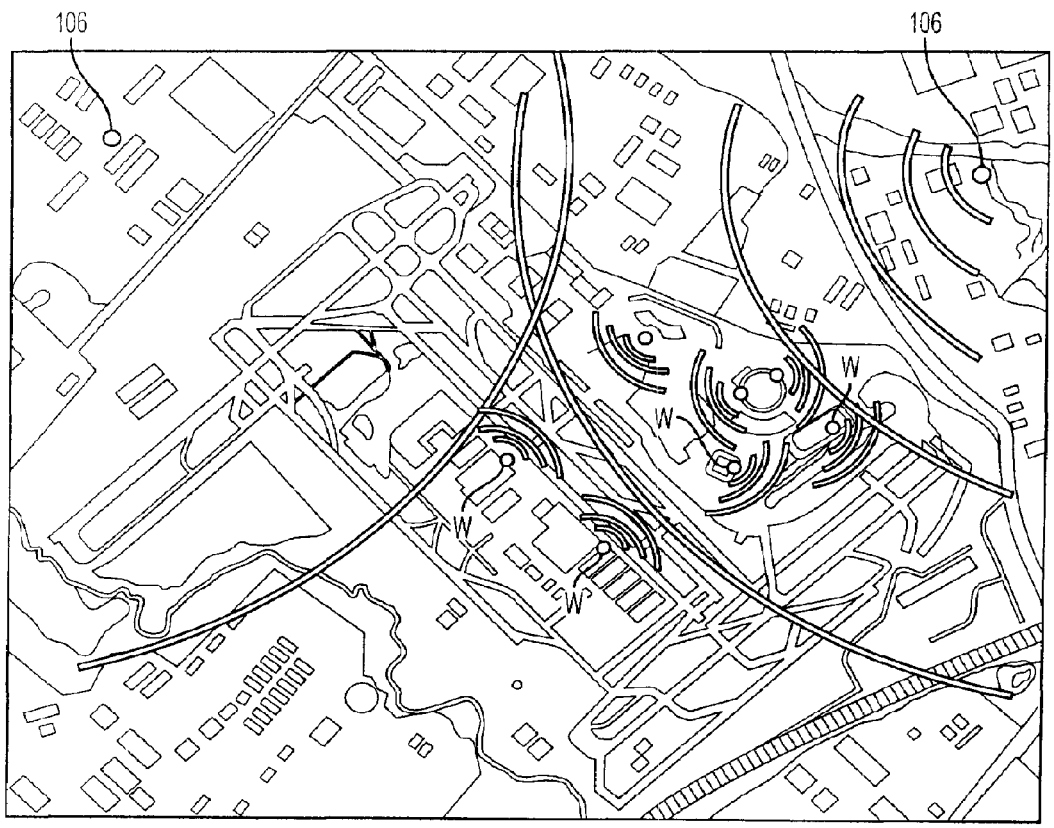
FIG. 6 is an aerial view illustrating an example of a broadcast range of the base stations of the system shown in FIG. 1 in relation to the broadcast range of WIFI type devices.
Figure 7:
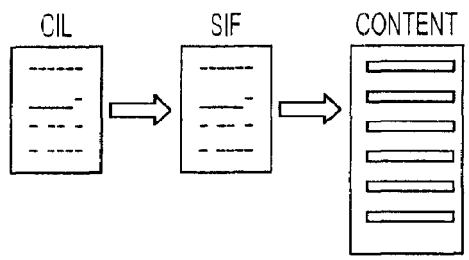
FIG. 7 illustrates one example of the manner in which content is provided to the system shown in FIG. 1.
Figure 8:
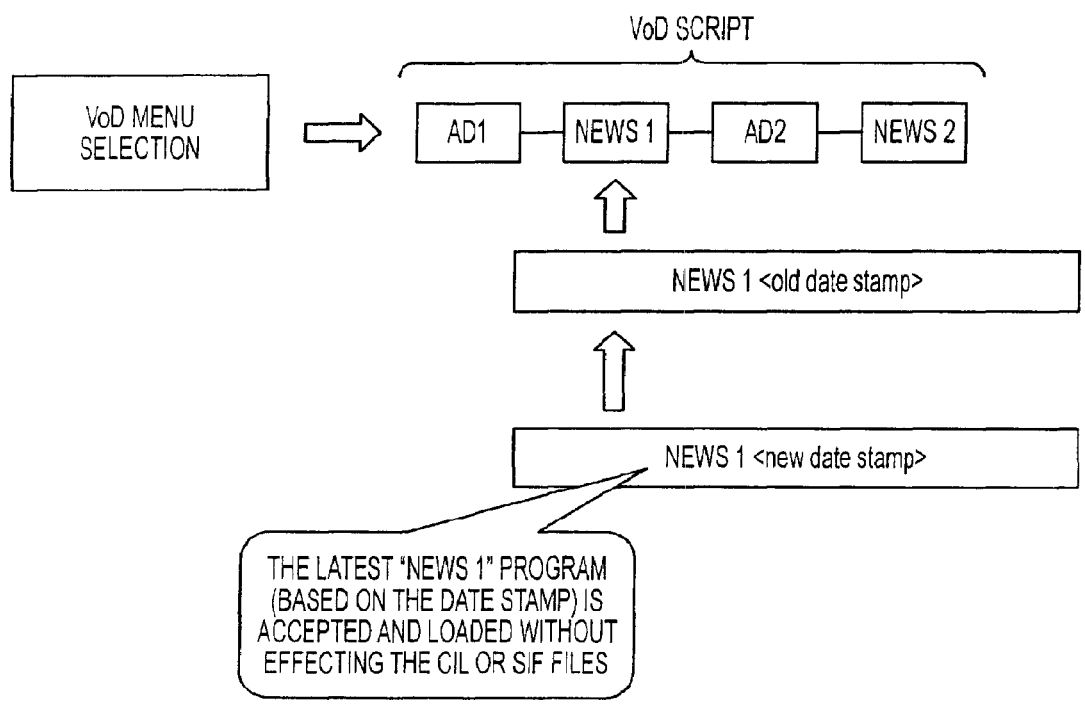
FIG. 8 illustrates an example in which video on demand (VoD) technology is used to provide content to the system shown in FIG. 1.
Figure 9:
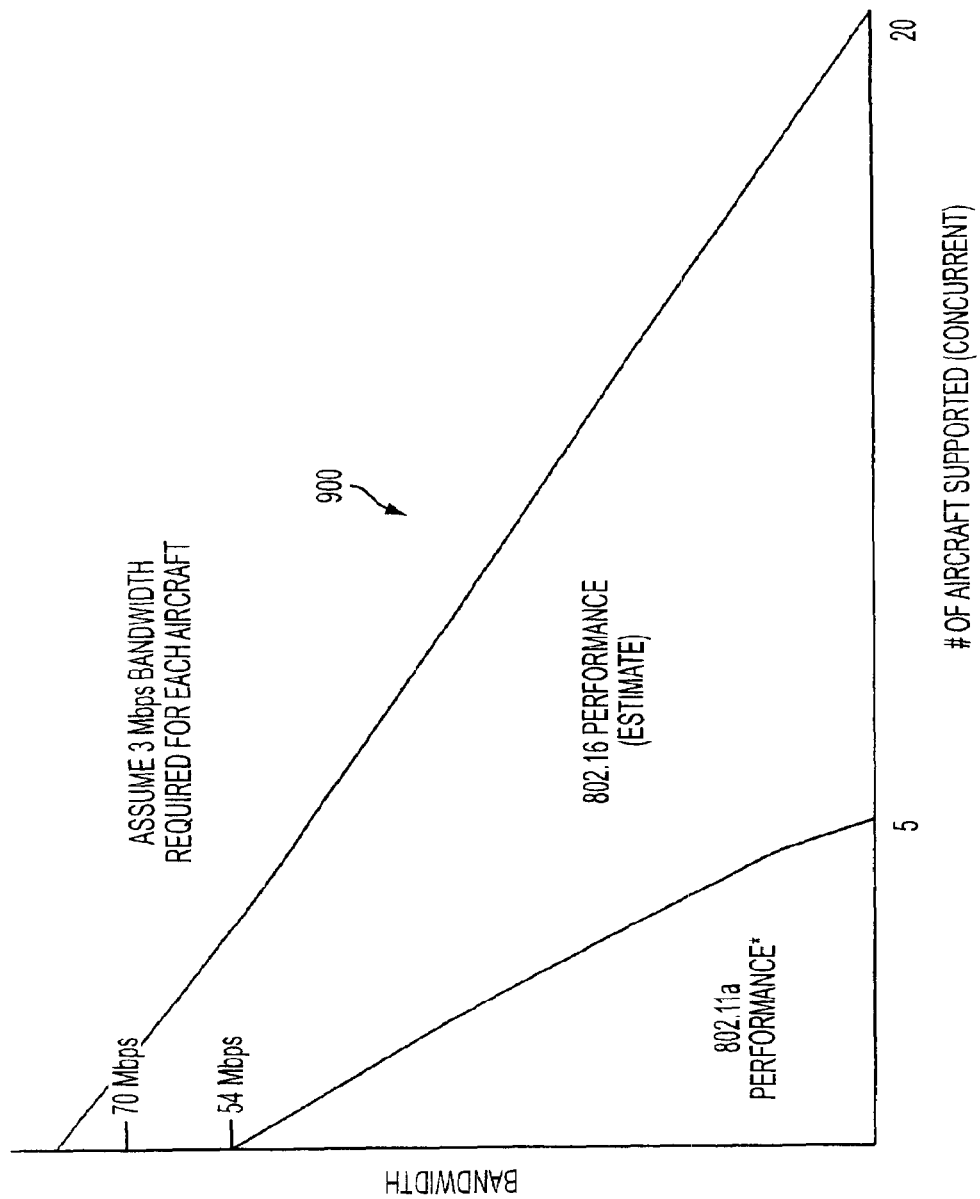
FIG. 9 is a graph illustrating an example of the performance of an IEEE Standard 802.16 system as employed in the system shown in FIG. 1 compared to an IEEE Standard 802.11a system.
Figure 10:
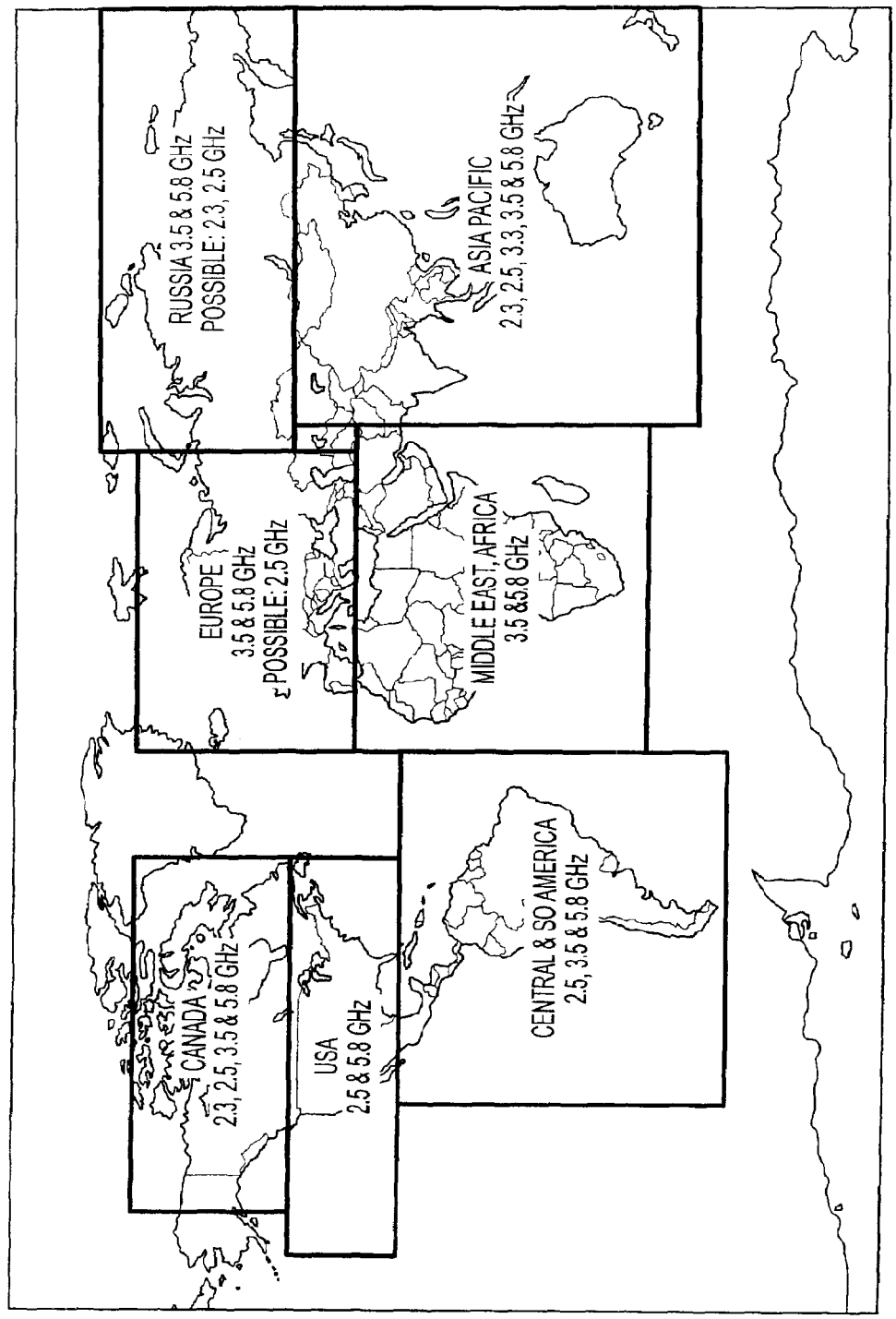
FIG. 10 illustrates an example of the different frequencies that can be used for the wireless links between the base stations of the system shown in FIG. 1 and aircraft in various locations around the world.

FIG. 6 is an aerial view illustrating an example of a broadcast range of the base stations 106 in relation to the broadcast range of WIFI type devices W. FIG. 7 illustrates one example of the manner in which content is provided. For instance, a common intermediate language (CIL) file can be converted into a standard input format (SIF) file and thus provided as the content. In another example, as shown in FIG. 8, a video on demand (VoD) menu can be used to provide the content, with the date stamps of the content (e.g., news 1) being updated as the content is updated. FIG. 9 is a graph 900 illustrating an example of the performance of an IEEE Standard 802.16 system as employed in the system 100, compared to an IEEE Standard 802.11a system. FIG. 10 illustrates an example of the different frequencies that can be used for the wireless links between the base stations 106 and aircraft 108 in various locations around the world.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'including', and 'having' introduce an open-ended statement of component structures and/or functions. In the specification and claims, the words 'a' and 'an' are used as indefinite articles meaning 'one or more'. While for the sake of clarity of description, several specific embodiments of the invention have been described, the scope of the invention is intended to be measured by the claims as set forth below.

What is claimed is:

1. A system for transferring content between a vehicle and another entity, the system comprising:
   a first communication device disposed at the vehicle; and
   a second communication device disposed at the entity;
   wherein:
      the first and second communication devices employ wireless communication technology to establish a link to communicate the content between each other; and
      the first communication device comprises a traffic prioritization mechanism to prioritize transfer of the content between the vehicle and the entity in accordance with at least one of available link speed, importance of the content, and anticipated connection time between the first and second communication devices.

2. The system of claim 1 wherein the vehicle comprises an aircraft.

3. The system of claim 1 wherein the entity comprises a base station at an airport.

4. The system of claim 1 wherein the first and second communication devices are operable to exchange identification information pertaining to the vehicle.

5. The system of claim 4 wherein the content is based on the identity of the vehicle.

6. A system for transferring content between a vehicle and another entity, the system comprising:
   a first communication device disposed at the vehicle; and
   a second communication device disposed at the entity;
   wherein:
      the first and second communication devices employ wireless communication technology to establish a link to communicate the content between each other; and
      the second communication device comprises a traffic prioritization mechanism to prioritize transfer of the content between the entity and the vehicle in accordance with at least one of available link speed, importance of content, and anticipated connection time between the first and second communication devices.

7. The system of claim 6 wherein the vehicle comprises an aircraft.

8. The system of claim 6 wherein the entity comprises a base station at an airport.

9. The system of claim 6 wherein the first and second communication devices are operable to exchange identification information pertaining to the vehicle.

10. The system of claim 9 wherein the content is based on the identity of the vehicle.

11. A system for transferring content, comprising:
   at least one base station; and
   an operations center that provides at least a portion of the content over a network to the at least one base station;
   wherein:
      the base station is disposed at a location with respect to an airport such that the airport is within a wireless transmission range of the base station;
      the base station is operable to establish a communication link with a vehicle over which to transfer the content between the base station and the vehicle; and
      the base station comprises a traffic prioritization mechanism to prioritize transfer of the content between the base station and the vehicle in accordance with at least one of available link speed, importance of the content, and anticipated connection time between the base station and the vehicle.

12. The system of claim 11 further comprising a plurality of base stations, each base station disposed at respective locations proximate to respective airports within their respective wireless transmission ranges.

13. The system of claim 11 wherein the base station and the vehicle are operable to exchange identification information pertaining to the vehicle.

14. The system of claim 13 wherein the base station provides the content to the vehicle based on the identity of the vehicle.

15. A method for delivering content between a vehicle and another entity, the method comprising:
   configuring a first communication device and a second communication device to employ wireless communication technology to establish a link to communication the content between each other, the first communication device disposed at the vehicle and the second communication device disposed at the entity; and
   prioritizing transfer of the content between the vehicle and the entity in accordance with at least one of available link speed, importance of the information, and anticipated connection time between the first and second communication devices.

16. The method of claim 15 wherein the vehicle comprises an aircraft.

17. The method of claim 15 wherein the entity comprises a base station at an airport.

18. The method of claim 15 further comprising operating the first and second communication devices to exchange identification information pertaining to the vehicle.

19. The method of claim 18 wherein the content is based on the identity of the vehicle.

20. The method of claim 15 further comprising providing content from an operations center over a network to the entity.

21. The method of claim 15 wherein configuring further comprises configuring a plurality of second communication devices, each second communication device disposed at a respective location within wireless transmission range of the entity.

* * * * *